Jan. 19, 1937.　　　W. C. BERRYMAN　　　2,068,530
CORROSION PREVENTING MEANS FOR CONNECTIONS
Filed Oct. 13, 1934
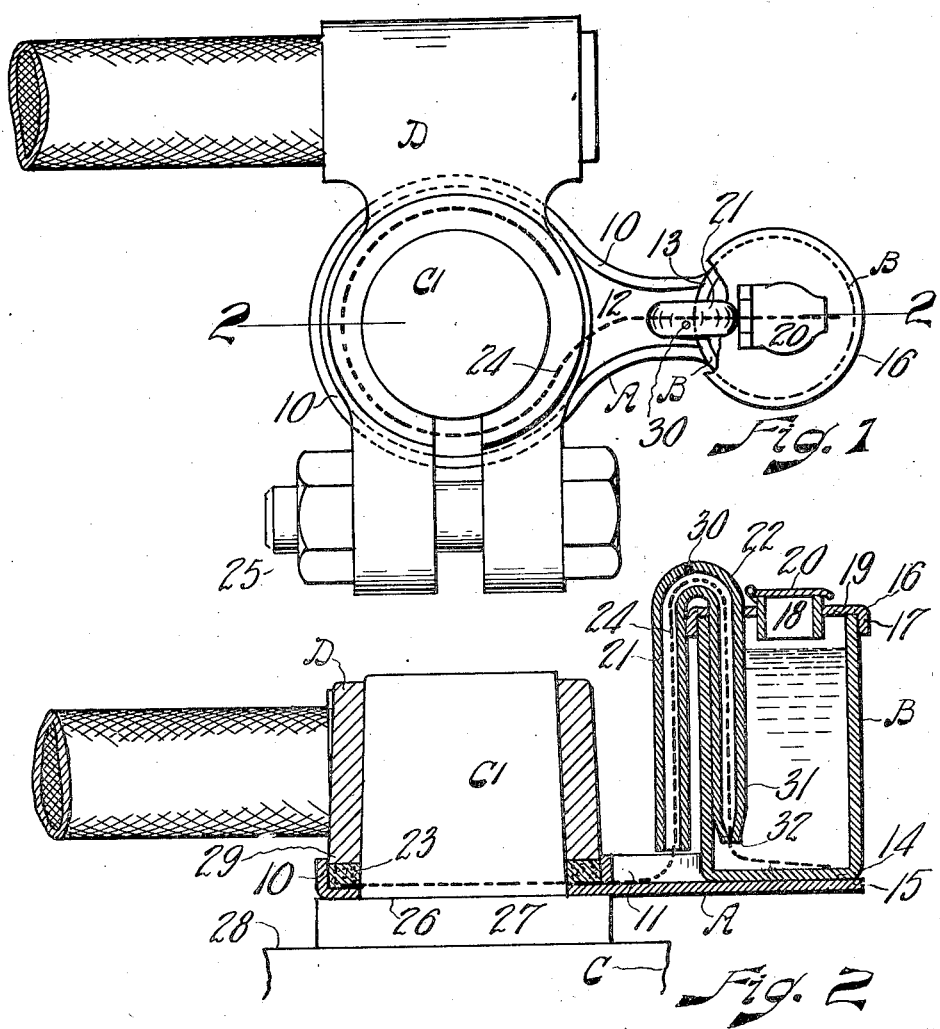
INVENTOR
W. C. Berryman
BY
C.T. Heinkel ATTORNEY Patented Jan. 19, 1937

2,068,530

UNITED STATES PATENT OFFICE 2,068,530

CORROSION PREVENTING MEANS FOR CONNECTIONS

Warren C. Berryman, Lakewood, Ohio

Application October 13, 1934, Serial No. 748,167

5 Claims. (Cl. 173—259)

The present invention relates to preventing corrosion of connections.

Many connections are subject to external and internal corrosion caused by external conditions acting thereon or therein. Atmospheric conditions may cause rust on or in connections when the connection is made of ferrous material or cause other corrosional conditions when made of other materials such as contain copper and the like. In such structures as electrical connections the action of electric current passing therethrough often causes corrosion and this is quite pronounced in such structures as storage battery connections. Pastes or paint-like substances have been applied to connections to prevent corrosion but such applications do not last and soon peel off or in other ways become useless and, if they remain paste-like, will collect dust and other foreign material which may become detrimental or dangerous to connections. When a liquid material is used to prevent corrosion, the application thereof must be attended to at intervals. Usually such liquid application is done carelessly so some of the liquid is spilled onto parts or mechanisms adjacent to the connection and cause corrosion therein or thereon. In storage battery connections for instance, the battery tops are easily corroded by such liquid flowing thereon.

The present invention aims to provide a corrosion preventing means which eliminates the disadvantages found in the prior art by providing means to feed corrosion preventing substance or material to a connection as required or necessary to keep the connection continually unctuous but in such a manner that it can not overflow onto adjacent mechanism and provide a corrosion preventing device which is a separate unit and adapted to be easily applied to and easily removed from connections.

Objects of my invention are:

To provide a unitary device, easily attachable to and easily removable from connections for preventing corrosion thereof.

To provide a reservoir for corrosion preventing substance on such a device so that a quantity of corrosion preventing substance is always on hand.

To provide such a device with means for feeding corrosion preventing substance to connections to keep the same unctuous.

To restrict this feeding so that there will be no overflow of the substance from the connection.

To provide vent means in such a device to prevent syphoning of the substance out of a reservoir.

To provide such a device with means to collect corrosion preventing substance in case the feeding means feeds too fast.

To provide on such devices a wick reaching into the reservoir and to the connections for feeding by capillary attraction and to cover the wick at its exposed parts to prevent foreign substance or material from collecting thereon.

To provide restrictive means to compress the wick to limit the capillary attraction therein for corrosion preventing substance.

To provide such a device with means whereby the same is easily attached to and removed from a connection and without any change in the connection or in the device.

Other objects will be pointed out in this specification, or will become obvious or apparent, or suggest themselves upon an inspection of this specification and the accompanying drawing.

The present invention is illustrated in the accompanying drawing and described in this specification as so illustrated.

In the accompanying drawing:

Fig. 1 is a plan view of a corrosion preventing device made for and applied to an electrical connection of a storage battery.

Fig. 2 is a section taken on line 2—2 of Fig. 1.

Similar reference characters refer to similar parts throughout the views.

The device of the present invention is made as a separate unit to be applied to existing connections, electrical and mechanical, to prevent corrosion of members of the connection and joints between members thereof and is to be applied thereto adjacent to the connecting members without altering the structure thereof.

The device herein shown and described, for the purpose of illustrating the present invention, is for connections of storage battery terminals to or with lead wires from the battery. However, this showing and describing is not to be understood as being or as being intended as a limitation for or of the present invention.

The device shown and described comprises, principally, a base member, a compressible, absorbent, lubricant conveying member, a reservoir for lubricant and a lubricant conveying wick leading from the interior of the reservoir to the connection.

The term "lubricant", as used in this specification and claims, is intended to include such material as will prevent rust or corrosion normally caused by natural actions or conditions, atmospheric or caused by conditions existing or brought about around connections or by action of something passing through the connection such as electric current from a storage battery or the acid or acid fumes from storage battery affecting the connection to corrode the same or one or more parts thereof.

The base A, in this instance, is formed of sheet material and has the flange 10 upturned from the diametrically larger part 11 of the base to form a receptacle for purposes appearing below. The flange 10 is continued from the part 11 and extends along the narrower neck part 12 and to the reservoir B and there forming the shoulders 13 to abut the reservoir.

The reservoir B is shown as being made diametrically round with the closed bottom 14 which contacts and is supported on the flat part 15 of the base A. The bottom of the reservoir is secured to the part 15 by any suitable means; soldering or welding have been found satisfactory for this securing. The shoulders 13 may also be secured to the reservoir in a similar manner to render the receptacle leak-proof and at the same time secure the reservoir more firmly on the base.

The reservoir closing cap 16, in this instance, is shown as having the annular flange 17 extending over the outside of the top of the reservoir and may fit thereto by a light drive fit so that the cap can be removed when desired. The reservoir filling cup 18 is driven into or otherwise secured to the top wall 19 of the cap for the purpose of filling the reservoir with lubricant. The lid 20 is hinged to the top of the filling cup so that the same can be opened easily for filling the reservoir and closed easily to prevent pollution of the lubricant in the reservoir.

The tube 21 has one end thereof driven into or otherwise secured to the top wall 19 of the cap and opens into the interior of the reservoir and terminates a little above the bottom of the reservoir.

The bent part 22 of the tube is shown as extending above the top of the cap to mitigate any tendency of the lubricant being syphoned out of the reservoir through the tube 21. The other end of the tube extends downwardly, along the outer side of the reservoir, and terminates a little above the top of the bottom plate of the base A.

The reservoir could also be inverted from its position as shown and above described. In that case, the open end of the reservoir is to contact and be secured to the part 15 of the base; precaution being taken so that this securing also seals the reservoir against leakage of lubricant. In that case, the reservoir filling cup 18 and the one end of the tube 21 are driven into or secured to what is now the bottom wall of the reservoir.

The annular washer 23 is a lubricant conveying and retaining member and is telescoped over the terminal post C1 of the battery C and, preferably, fits snugly thereon for good contact therewith. This washer may be made of felt or wool or a combination of felt and wool and is of porous and absorbent and compressible material for reasons appearing below. Wool is very good material for connections associated with acid or acid fumes since acid does not seem to affect it very much.

The one piece wick 24 is a lubricant conveying member and extends through the tube 21 and one end thereof extends into the interior of the reservoir as shown and the other end lies in the neck part 12 and continues and lies in the bottom of the round part of the receptacle in arcuate form and contacts the washer 23.

The vent hole 30 is provided in the curved part 22 of the tube 21, preferably at the highest point thereof as an additional safeguard to prevent the lubricant from syphoning out of the reservoir.

The part 31 of the tube 21 extends nearly to the bottom of the reservoir as shown and has the lower end 32 thereof contracted, preferably after the wick is therein to diametrically compress the wick at that point so that lubricant may not pass through the wick too fast and is compressed at the point 32 according to feeding of lubricant required. This compressing of the wick diametrically, together with the other flow restriction means affords ample facility to regulate and adjust the flow of lubricant through the wick and to the connection so that there is very little danger of the corrosion preventing device from overflowing. The washer 23, although centralized on the battery post C1, is also confined laterally by the flange 10 which also confines the lower end of the lead wire terminal and lets the same telescope thereinto when the washer is compressed and while it is being compressed.

The receptacle formed by this upturned flange 10 is closed at the top by the bottom of the lead wire terminal to prevent foreign substance from getting into the reservoir. When it is desired to make the receptacle more complete, the flange 10 may be made continuous all around in which case the outer end of the tube 21 may be brought up to and even anchored in this continuing wall.

The device shown and described is applied to the terminal post shown by first removing the lead wire terminal D from the terminal post by releasing the bolt 25 and sliding the lead wire terminal from the post endwise. The device with the wick therein is then telescoped over the terminal post until the bottom of the receptacle thereof contacts the shoulder 26 on the collar 27 above the battery top 28. The washer 23 is then telescoped over the terminal post and pressed down to the bottom of the receptacle. The lead wire terminal is then telescoped over the terminal post and moved down thereon until the bottom thereof contacts the washer 23 which is in contact with the arcuate end of the wick in the receptacle and may have the lower end 29 thereof sufficiently small diametrically so that this end can telescope into the diametrically larger part of the base and may fit into the flange 10 thereof. By this means, the washer can be compressed by moving the lead wire terminal further down on the terminal post and the larger portion of the diametrically larger part is sealed against leakage of lubricant therefrom and onto the battery top. This leakage preventing keeps the lubricant from dripping or flowing onto the battery top and thereby prevents injury thereto. The bolt 25 is then tightened to clamp the lead wire terminal onto the terminal post and thereby holds the washer and wick and base together and holds the device to the connection and holds the connection members together.

When lubricant is put into the reservoir through the cup 18, the wick end therein will first absorb lubricant from the reservoir. This lubricant will then creep along in the wick to its outer end and thereby conveys itself to the washer and is absorbed thereby to saturate the same. The lubricant then conveys itself from the washer to the bottom of the lead wire terminal and also to the terminal post from where it creeps over the outside of the entire connection and to the joint between the post and the lead wire terminal and thereby prevents corrosion.

The lubricant is fed to the connection by capillary attraction thereof through the wick and thereby prevents overflowing of lubricant at the connection onto the top of the battery. The flange around the receptacle normally retains lubricant therein which is absorbed by the washer and thereby keeps the washer saturated with lubricant.

Due to the structure set forth, the lubricant does not syphon out of the reservoir to fill the receptacle to overflowing but there always is sufficient lubricant in the receptacle and in the washer in contact on the connection, restrictively conveyed thereto, to lubricate the same for preventing corrosion.

When the tube 21 is not desired, a channel formed tail may extend from the cap 16 and bend downwardly and alongside of the side of the reservoir and may extend over the neck part 12 to cover the wick and the receptacle at the side of the diametrically larger part which is covered by the lower end of the lead wire terminal. When the connection is installed in a place where extraneous substance is not present or can not collect on the wick, the tube 21 or other protecting means can be eliminated.

The invention shown and described provides a unitary structure easily attachable to and removable from connections, prevents overflow of lubricant from the device and affords a continuous means for preventing corrosion of connections to which it is applied.

Having described my invention and without limiting myself to the precise application of my invention as shown and described or to the precise structure and arrangement of elements as shown and described,

I claim:

1. A unitary device attachable to a jointed connection for feeding lubricant to a joint thereof, including, a base member having a hole through the bottom thereof for telescoping said base member over a member of the connection and having an annular flange upturned from said base member and encircling only the lower part of the connection, a reservoir carrying part at one side of and outside of said annular flange, a lubricant containing reservoir mounted on the top of said reservoir carrying part, and means for conveying and feeding lubricant from said reservoir to said flanged part of said base member.

2. In combination, a connection having joined parts and a unitary joint lubricating device including a base telescoped over one part of the connection and fitting sealingly thereto and being easily telescoped thereover and therefrom, a receptacle on said base around said one part, a lubricant containing reservoir on said base at one side of said receptacle, a porous washer in said receptacle and in contact on joined parts of the connection, one of the joined connection members closing the top of said receptacle and telescoping thereinto, and means for restrictively feeding lubricant from said reservoir to said washer.

3. A unitary device attachable to a joined connection for lubricating a joint thereof, including, a base having a hole therethrough to telescope and sealingly fit to one of the joined parts of the connection, a receptacle on the top of said base, a lubricant containing reservoir on the top of said base sidewise of said receptacle, a porous, absorbent washer in said receptacle and contacted by the joined parts of the connection when the device is applied thereto, a wick leading from the interior of said reservoir to said washer, and a wick inclosing U shaped tube having one leg thereof extending into said reservoir and the other leg thereof extending into said receptacle.

4. A unitary device attachable to a joined connection for lubricating a joint thereof, including, a base having a hole therethrough to telescope and sealingly fit to one of the joined parts of the connection, a receptacle on the top of said base, a lubricant containing reservoir on the top of said base sidewise of said receptacle, a porous, absorbent washer in said receptacle and contacted by the joined parts of the connection when the device is applied thereto, a wick leading from the interior of said reservoir to said washer, a wick inclosing U shaped tube having one leg thereof extending into said reservoir and the other leg thereof extending into said receptacle, and a permanently open vent means in the upper part of said tube to prevent capillary attraction from siphoning the lubricant out of said reservoir.

5. A lubricating device for joined parts, including, a base having a hole therethrough for sealingly fittingly telescoping the device over one of the joined parts, a flange upstanding from said base to form a receptacle around the one of the joined parts, a lubricant containing reservoir on the top of said base, an openable and closeable filling cup in the top of said reservoir, an annular absorbent washer in said receptacle and in contact with both of the joined parts when the device is attached thereto, a wick leading from the interior of said reservoir to said washer, a protection means over the exposed part of said wick, restricting means to limit the feeding of lubricant through said wick, and a vent means to prevent the lubricant from being siphoned out of said reservoir.

WARREN C. BERRYMAN.